United States Patent
Nakano

(10) Patent No.: US 10,055,141 B2
(45) Date of Patent: Aug. 21, 2018

(54) STORAGE DEVICE, LIQUID CONTAINER, AND HOST DEVICE

(71) Applicant: SEIKO EPSON CORPORATION, Tokyo (JP)

(72) Inventor: Shuichi Nakano, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 15/413,583

(22) Filed: Jan. 24, 2017

(65) Prior Publication Data

US 2017/0235523 A1 Aug. 17, 2017

(30) Foreign Application Priority Data

Feb. 16, 2016 (JP) .................................. 2016-026519

(51) Int. Cl.
*G06F 3/06* (2006.01)
*G06F 11/10* (2006.01)
*H04N 1/32* (2006.01)

(52) U.S. Cl.
CPC ............ *G06F 3/0611* (2013.01); *G06F 3/064* (2013.01); *G06F 3/0619* (2013.01); *G06F 3/0659* (2013.01); *G06F 3/0673* (2013.01); *G06F 11/1004* (2013.01); *H04N 1/32122* (2013.01); *H04N 2201/0082* (2013.01)

(58) Field of Classification Search
None
See application file for complete search history.

(56) References Cited

U.S. PATENT DOCUMENTS

| | | | | |
|---|---|---|---|---|
| 9,743,032 B2* | 8/2017 | Robinson | ............. | H04N 5/4403 |
| 9,792,069 B2* | 10/2017 | Knestele | ............... | G06F 3/0641 |
| 2009/0265602 A1* | 10/2009 | Nakano | ................ | B41J 2/17546 |
| | | | | 714/799 |
| 2012/0092696 A1* | 4/2012 | Nakano | ................. | B41J 2/1753 |
| | | | | 358/1.14 |
| 2012/0166716 A1* | 6/2012 | Schuette | ............ | G11C 13/0004 |
| | | | | 711/103 |
| 2012/0173795 A1* | 7/2012 | Schuette | ............. | G06F 12/0246 |
| | | | | 711/103 |
| 2016/0246537 A1* | 8/2016 | Kim | ....................... | G06F 11/108 |

FOREIGN PATENT DOCUMENTS

| | | | |
|---|---|---|---|
| JP | 2009-259225 A | 11/2009 |
| JP | 2012-088779 A | 5/2012 |

* cited by examiner

*Primary Examiner* — Steve Nguyen

(57) ABSTRACT

Provided is a storage device, a liquid container and a host device that appropriately control whether or not writing is to be performed with an efficient data configuration.
The storage device 100 includes a control unit 110 that performs processing for communication with a host device 400, a storage unit 120, and a storage control unit 130 that performs access control on the storage unit 120. The control unit 110 receives a write data packet from the host device 400, and if a data pattern of write data included in the write data packet and additional data is judged as not matching a specific pattern, makes update instruction of address information and write instruction regarding write data to the storage control unit 130. If judged as matching, the control unit 110 does not make a write instruction regarding the write data, while making an update instruction of the address information.

10 Claims, 13 Drawing Sheets

| LOGICAL ADDRESS | 31 ············ 24 | 23 ············ 0 |
|---|---|---|
| A1 | DATA1[7:0] | ADDITIONAL DATA |
| A2 | DATA2[7:0] | ADDITIONAL DATA |
| A3 | DATA3[7:0] | ADDITIONAL DATA |
| ⋮ | ⋮ | ⋮ |
| Am | DATAm[7:0] | ADDITIONAL DATA |

FIG. 5

| PHYSICAL ADDRESS | LOGICAL ADDRESS |
|---|---|
| PA1 | A1 |
| PA2 | A2 |
| PA3 | A3 |
| ⋮ | ⋮ |
| PAm | Am |

FIG. 6

| LOGICAL ADDRESS | LOGICAL PAGE |
|---|---|
| A1<br>A2<br>A3<br>A4 | P1 |
| A5<br>A6<br>A7<br>A8 | P2 |
| ⋮ | ⋮ |

FIG. 7

STORAGE DEVICE, LIQUID CONTAINER, AND HOST DEVICE

Priority is claimed under 35 U.S.C. § 119 to Japanese Applications No. 2016-026519 filed on Feb. 16, 2016 which is hereby incorporated by reference in their entirety.

BACKGROUND

1. Technical Field

The present invention relates to a storage device, a liquid container, and a host device.

2. Related Art

Storage devices that sequentially store pieces of data transmitted from a host device are known. There are cases where, in such storage devices, processing of pieces of data of logical addresses that are accessed before a desired logical address needs to be performed in order to execute write processing of a piece of data corresponding to the desired logical address. For example, in the case where first to k-th (k is an integer of two or more) write data packets are sequentially transmitted from a host device, the first to k−1-th write data packets need to be received as well in order to perform write processing of the k-th write data packet in the storage device. In this case, if the storage device executes write processing of the first to k−1-th write data packets, the write time greatly increases.

Therefore, a storage device or a host device in which a data packet that need not be written is not written is disclosed.

A host device that transmits a write data packet to which a data parity bit is added to a storage device and the storage device in which an error detection operation decoder checks the parity and writing is not enabled when there is an error are disclosed in JP-A-2009-259225. According to the method in JP-A-2009-259225, the host device generates data (feeding coded data) including an error with respect to an address where the data need not to be written and transmits the data to the storage device, and as a result, the storage device can omit write processing.

Also, a host device that transmits a data packet including a write enable bit WE to a storage device and the storage device that, in the case where the write enable bit WE designates that writing is not permitted, only updates the address and does not perform writing are disclosed in JP-A-2012-88779. According to the method in JP-A-2012-88779, as a result of the host device transmitting a data packet, in which the write enable bit WE is set such that writing is not permitted, to the storage device, the storage device can omit write processing.

With the method disclosed in JP-A-2009-259225, when an error is detected, the storage device cannot distinguish between an error actually having occurred and the host device having transmitted the feeding coded data. Also, with the method disclosed in JP-A-2012-88779, the host device needs to include the write enable bit WE in a data packet that is to be transmitted. Therefore, the size of the data packet increases, or the size of write data that is included in the data packet decreases.

SUMMARY

According to some aspects of the invention, a storage device, a liquid container, and a host device that can appropriately control whether or not writing is to be performed with an efficient data configuration are provided.

One aspect of the invention relates to a storage device including: a control unit that performs processing for communication with a host device; a storage unit to which write data included in a write data packet that is transmitted from the host device is to be written; and a storage control unit that performs access control on the storage unit. The control unit receives the write data packet from the host device, in the case where a data pattern constituted by the write data and additional data that are included in the write data packet is judged as not matching a specific pattern, along with making an update instruction of address information, makes a write instruction regarding the write data to the storage control unit, and in the case where the data pattern constituted by the write data and the additional data is judged as matching the specific pattern, does not make a write instruction regarding the write data, but makes an update instruction of the address information to the storage control unit.

In one aspect of the invention, the control unit of the storage device determines whether or not a write instruction regarding write data is made based on a result of judging whether or not the data pattern constituted by write data and additional data matches a specific pattern. Accordingly, data (bit) dedicated for judging whether or not writing is to be performed need not be used, and therefore, a storage device can be realized that skips write processing with an efficient data configuration.

Also, in one aspect of the invention, the additional data may be data for error checking of the write data.

Accordingly, the data for error checking can also be used as data for judging (skip judgement) whether or not writing is to be performed, and as a result, a storage device can be realized that skips write processing with an efficient data configuration.

Also, in one aspect of the invention, the control unit, in the case where the error checking judges that there is an error, based on the write data packet and the additional data, and the data pattern is judged as not matching the specific pattern, may transmit information indicating a data error to the host device.

Accordingly, as a result of performing both error check processing and skip judgement processing, data error can be appropriately judged.

Also, in one aspect of the invention, the specific pattern may be data that is to be judged as an error in the error checking.

Accordingly, the possibility of misjudging the write data that is to be written as being write data that is not to be written can be suppressed.

Also, in one aspect of the invention, the write data packet includes parity data as the additional data, and the control unit, in the case where the data pattern constituted by the write data and the parity data is judged as not matching the specific pattern, and a relation between the write data and the parity data is correct, along with making an update instruction of address information, may make a write instruction regarding the write data to the storage control unit, and in the case where the data pattern constituted by the write data and the parity data is judged as matching the specific pattern, may not perform write instruction regarding the write data, but may make an update instruction of the address information to the storage control unit.

Accordingly, parity data can be used as the additional data.

Also, in one aspect of the invention, the write data packet includes inversion data of the write data as the additional data, and the control unit, in the case where the data pattern constituted by the write data and the inversion data is judged as not matching the specific pattern, along with making an update instruction of address information, may make a write instruction regarding the write data to the storage control unit, and in the case where the data pattern constituted by the write data and the inversion data is judged as matching the specific pattern, may not perform write instruction regarding the write data, but may make an update instruction of the address information to the storage control unit.

Accordingly, inversion data can be used as the additional data.

Also, in one aspect of the invention, the specific pattern may be a pattern that is constituted by first data and second data that is not inversion data of the first data.

Accordingly, the possibility of misjudging the write data that is to be written as being write data that is not to be written can be suppressed.

Also, in one aspect of the invention, the write data packet includes parity data and inversion data of the write data as the additional data, and the control unit, in the case where a data pattern constituted by the write data, the parity data, and the inversion data is judged as not matching the specific pattern, and a relation between the write data and the parity data is correct, along with making an update instruction of address information, may make a write instruction regarding the write data to the storage control unit, and in the case where the data pattern constituted by the write data, the parity data, and the inversion data is judged as matching the specific pattern, may not perform write instruction regarding the write data, but may make an update instruction of the address information to the storage control unit.

Accordingly, parity data and inversion data can be used as the additional data.

Also, in one aspect of the invention, the control unit receives first to m-th (m is an integer of two or more) write data packets as the write data packet corresponding to a command packet, i-th (i is an integer that satisfies $1 \leq i \leq m$) write data packet of the first to m-th write data packets including i-th write data and i-th additional data, in the case where a data pattern constituted by the i-th write data and the i-th additional data is judged as not matching the specific pattern, along with making an update instruction of the address information, may make a write instruction regarding the i-th write data to the storage control unit, and in the case where the data pattern constituted by the i-th write data and the i-th additional data is judged as matching the specific pattern, may not perform write instruction regarding the i-th write data, but may make an update instruction of the address information to the storage control unit.

Accordingly, in the case of receiving a plurality of write data packets from the host device, the control unit can determine whether or not a write instruction is made to the storage control unit for each write data packet.

Also, in one aspect of the invention, the control unit may include a comparator unit that compares the data pattern with the specific pattern, and an error detection unit that performs error checking based on the additional data.

Accordingly, the control unit can perform skip judgement and error check processing.

Also, another aspect of the invention relates to a liquid container including the aforementioned storage device.

Also, another aspect of the invention relates to a host device including: a communication processing unit that performs processing for communication with first to n-th (n is an integer of two or more) storage devices; and a control unit that controls the communication processing unit. The communication processing unit, in the case of transmitting a command packet and a plurality of write data packets corresponding to the command packet to a j-th (j is an integer that satisfies $1 \leq j \leq n$) storage device of the first to n-th storage devices, each write data packet of the plurality of write data packets including write data and additional data, sets the write data packet whose write data is not to be written to a storage unit of the j-th storage device such that a data pattern constituted by the write data and the additional data matches a specific pattern, and sets the write data packet whose write data is to be written to the storage unit of the j-th storage device such that the data pattern constituted by the write data and the additional data does not match the specific pattern.

In another aspect of the invention, the host device sets a data pattern that is constituted by write data and additional data according to whether or not the write data is to be written to a storage unit of a storage device. Accordingly, the host device can transmit information that causes the storage device to skip write processing with an efficient data configuration.

BRIEF DESCRIPTION OF THE DRAWINGS

The invention will be described with reference to the accompanying drawings, wherein like numbers reference like elements.

FIG. 5 is an exemplary data configuration corresponding to logical addresses.

FIG. 6 is an exemplary relation between logical addresses and physical addresses.

FIG. 7 is an exemplary relation between logical addresses and logical pages.

DESCRIPTION OF EXEMPLARY EMBODIMENTS

Figure 1:
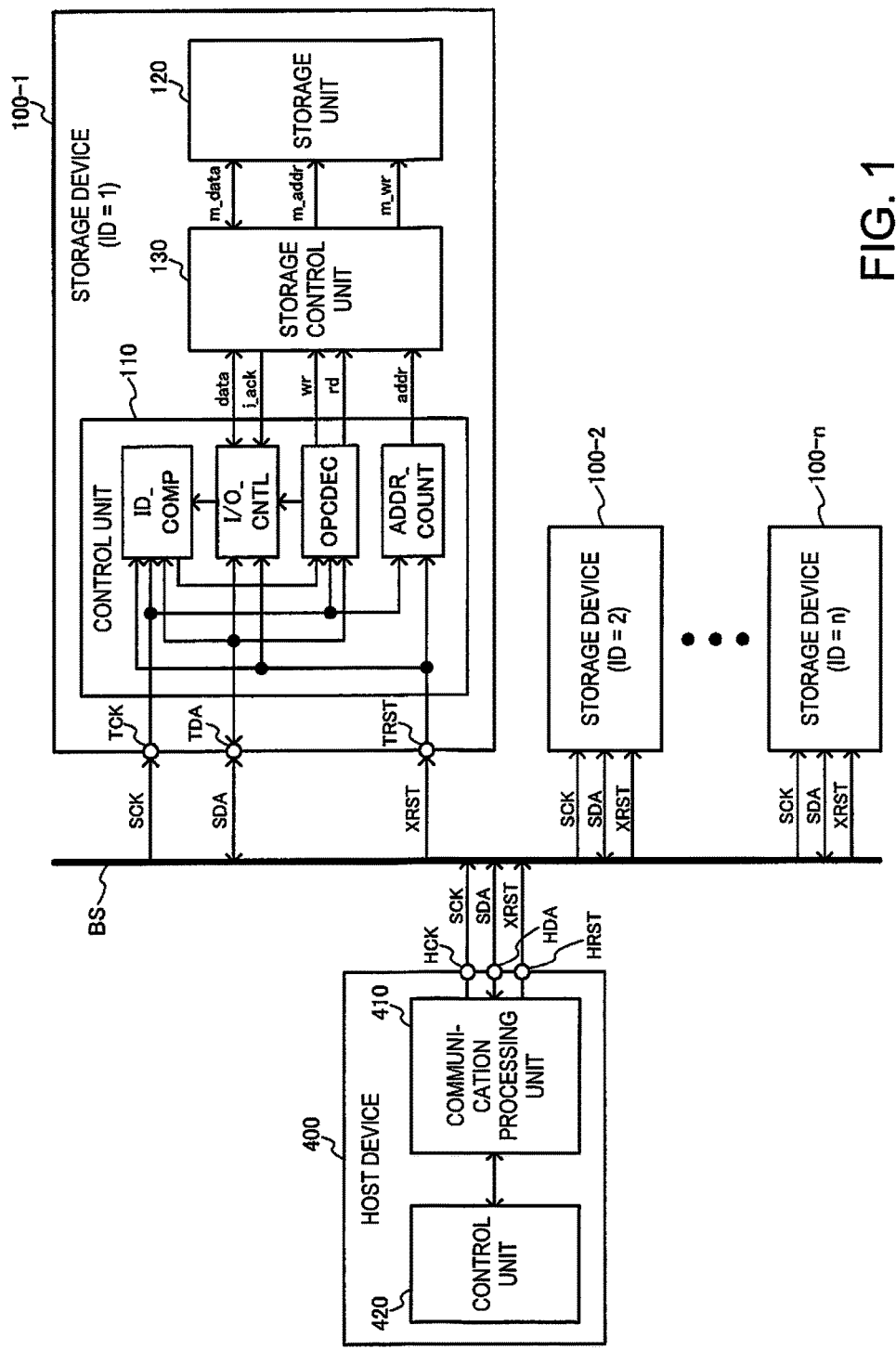
FIG. 1 is a basic exemplary configuration of a storage device and a host device.

Hereinafter, a present embodiment will be described. Note that the present embodiment described below is not intended to unduly limit the content of the invention described in the scope of claims. Also, not all configurations described in the present embodiment are necessarily essential elements of the invention.

1. Method of Present Embodiment

First, a method of the present embodiment will be described. In a storage device that sequentially communicates data with a host device, write processing can be accelerated by controlling whether or not data is to be written.

A communication packet that is transmitted and received between the host device and the storage device includes an ID packet IDPK, a command packet CMPK, and m data packets DPK1 to DPKm, as in a known method that will be described later using FIG. 3, for example. There are cases where, among these data packets, only a k-th (k is an integer that satisfies $1<k\leq m$) data packet DPKk needs to be written, and other data packets need not be written. For example, in the case where a value of data corresponding to the data packet DPKk is updated through processing on the host device side while the other pieces of data are not updated and current values need to be retained, it is sufficient that only the data packet DPKk is written.

However, in the case where data is written to a sequential access storage device, the host device sequentially transmits data packets starting from the lead packet. Therefore, the host device cannot transmit the k-th data packet DPKk following the command packet CMPK, and transmits a communication packet including the first to k−1-th data packets DPK1 to $DPK_{k-1}$ to the storage device. In this case, if the storage device performs write processing for all the first to k−1-th data packets DPK1 to $DPK_{k-1}$, the time needed to perform the processing is prolonged, and it is not efficient. Also, there is a demand for writing important data at high speed in cases such as a case where necessary data is to be saved to a storage device in a limited time due to an abnormal power supply in the host device.

A method in which a data packet that need not be written is not written is disclosed in JP-A-2009-259225 and JP-A-2012-88779. However, in the method of JP-A-2009-259225, the host device generates a data packet which is not to be written (feeding coded data) so as to cause a parity error, and the data packet is transmitted. The storage device omits write processing upon detecting a parity error. Therefore, the storage device cannot distinguish between a data error actually occurring and the feeding coded data when a parity error is detected, and cannot detect error using the parity bit.

Also, in the method of JP-A-2012-88779, the storage device uses the write enable bit WE to judge that writing is not to be performed. FIG. 3, which will be described later, is a diagram for describing the method of JP-A-2012-88779. In an example of FIG. 3, the host device transmits, when transmitting 8-bit data D0 to D7, a 10-bit data packet including D0 to D7, the write enable bit WE, and a parity bit DR Therefore, the size of the data packet increases. Also, in the case where the increase in size of the data packet is suppressed by using one bit of D0 to D7 as the write enable bit WE, the data portion decreases to 7 bits.

A storage device 100 according to the present embodiment includes, as shown in FIG. 1, a control unit 110 that performs processing for communication with a host device 400, a storage unit 120 to which write data included in the write data packet transmitted from the host device 400 is written, and a storage control unit 130 that performs access control on the storage unit 120. The control unit 110 receives a write data packet from the host device 400, and in the case where the data pattern constituted by the write data and additional data included in the write data packet is judged as not matching a specific pattern, along with making an update instruction of address information, makes a write instruction regarding the write data to the storage control unit 130. On the other hand, in the case where the data pattern constituted by the write data and the additional data is judged as matching the specific pattern, the control unit 110 does not make a write instruction regarding the write data, but makes an update instruction of the address information to the storage control unit 130.

Here, the write data packet is a piece of data that includes g-bit write data and h-bit additional data. g is a positive integer and is g=8, for example. h is a positive integer and is h=1 in the case of a parity bit. The additional data is not limited to the parity bit, as is the case of a modification described later using FIG. 16. Note that in the case where the data pattern matches the specific pattern, although the data included in the write data packet is not written to the storage unit 120, g-bit data of the write data packet is denoted as write data, and h-bit data is denoted as additional data in such a case as well.

Also, the data pattern refers to an arrangement (sequence) of values of bits included in the write data and the additional data. In an example in which 8-bit write data is transmitted from the host device 400 and 1-bit additional data is transmitted after the write data, information in which nine values of 0 or 1 are combined is the data pattern. In this example, the data pattern may take $2^9$ patterns.

Also, the specific pattern is a pattern with which the data pattern constituted by the write data and the additional data is to be compared. Therefore, the format of the specific pattern is similar to that of the data pattern constituted by the write data and the additional data, and the specific pattern is information in which nine values of 0 or 1 are combined in the example described above.

According to the method of the present embodiment, the storage device 100 (control unit 110) can judge whether the write data is to be written or not to be written based on whether or not the data pattern constituted by the write data and the additional data matches a fixed specific pattern.

Since a fixed specific pattern is used, the possibility of the data pattern accidentally matching the specific pattern due to an error, despite not intending that writing not be performed, can be suppressed. In other words, with the storage device 100 of the present embodiment, the possibility of mixing an error state and a state where writing is not permitted can be suppressed. For example, a case is considered in which the additional data is a parity bit based on an odd parity, and FFh+"0" ("111111110") is used as the specific pattern. In this case, a case in which the data pattern matches the specific pattern due to an error is limited to specific cases such as a case where the write data is FFh ("11111111") and the parity bit that ought to "1" becomes "0" due to a parity error. Furthermore, in the case of the modification that will be described later using FIG. 16, the data pattern of a write data packet that is intended to be written does not match the specific pattern unless errors occur in a plurality of bits, and the possibility of the storage device 100 misjudging an error state as a state where writing is not to be performed or vice versa can be suppressed.

Also, since the storage device 100 of the present embodiment can judge (skip judgement) whether or not writing is to be performed based on the write data and the additional data, a bit dedicated to the skip judgement such as the write enable bit WE in JP-A-2012-88779 need not be used. Accordingly, the state where writing is not permitted can be judged with an efficient data configuration in which the size of the write data packet does not increase or the size of the write data does not decrease.

Note that the additional data is a piece of data that is added for a purpose other than the skip judgement, and therefore the increase in size caused by including the additional data to the write data packet is not an issue. Specifically, the additional data is a piece of data for error checking in write data. That is, the additional data can be used both for error checking and for skip judgement, and thus the data can be used without waste. Even if the additional data is used for skip judgement, the possibility of the additional data losing the error checking function is small, as described above.

Hereinafter, an exemplary configuration of the storage device 100 and the host device 400 according to the present embodiment will be described, and thereafter, an exemplary structure of a communication packet that is transmitted from the host device 400 to the storage device 100 and an exemplary structure (example of a memory map) of data to be stored in the storage device 100 will be described. Furthermore, after describing a flow of write processing of data in the present embodiment, an example of a system (a system including a printing system, a printing device, and a liquid container) including the host device 400 and the storage device 100 will be described. Finally, a modification of the data configuration will be described.

Note that, hereinafter, a description will be given assuming that the specific pattern is "111111110", and different embodiments will be described later as a modification.

2. Storage Device and Host Device

FIG. 1 shows a basic exemplary configuration of the storage device and the host device of the present embodiment. The storage device 100 of the present embodiment includes a control unit 110, a storage unit 120, a storage control unit 130, a clock terminal TCK, a data terminal TDA, and a reset terminal TRST. Also, the host device 400 of the present embodiment includes a communication processing unit 410, a control unit 420, a clock terminal HCK, a data terminal HDA, and a reset terminal HRST. Note that the configuration of the storage device and the host device of the present embodiment is not limited to the configuration of FIG. 1, and various modifications can be implemented such as omitting a portion of the constituent elements, replacing a portion of the constituent elements with another constituent element, or adding another constituent element.

The storage device 100 (100-1 to 100-n (n is an integer of two or more)) is connected to the host device 400 via a bus BS. The bus BS includes a clock signal line SCK, a data signal line SDA, and a reset signal line XRST as shown in FIG. 1, for example. The host device 400 supplies a clock to a plurality of storage devices 100-1 to 100-n via the clock signal line SCK. Also, data or the like is transmitted or received between the host device 400 and each storage device 100 via the data signal line SDA. Also, the host device 400 outputs a reset signal to the plurality of storage devices 100-1 to 100-n via the reset signal line XRST.

The plurality of storage devices 100-1 to 100-n each have ID information, and the host device 400 can transmit a command or data to one storage device from among the plurality of storage devices 100-1 to 100-n by designating the ID information. For example, in FIG. 1, the ID information of the first storage device 100-1 is ID=1, and the ID information of the second storage device 100-2 is ID=2.

Each storage device 100 includes a clock terminal TCK (first terminal, in a broad sense), a data terminal TDA (second terminal, in a broad sense), and a reset terminal TRST (third terminal, in a broad sense). A clock signal line SCK is connected to the clock terminals TCK, a data signal line SDA is connected to the data terminals TDA, and a reset signal line XRST is connected to the reset terminals TRST.

The control unit 110 in the storage device 100 performs processing for communication with the host device 400 connected via the bus BS. Specifically, as shown in FIG. 1, the control unit 110 receives a command (command packet), write data (write data packet), and the like that are transmitted from the host device 400 via the data signal line SDA based on the clock and the reset signal from the host device 400, and transmits data that is read out from the storage unit 120, a later-described acknowledge, and the like to the host device 400 via the data signal line SDA.

The storage unit 120 is a nonvolatile memory device, and data from the host device 400 is written to the storage unit 120. The storage unit 120 can be realized by a MONOS (Metal-Oxide-Nitride-Oxide-Silicon) type memory. Note that the storage unit 120 can be realized by an EEPROM other than a MONOS type memory, a ferroelectric memory, or the like. The storage control unit 130 performs access control on the storage unit 120.

The control unit 110 includes an ID comparator ID_COMP, an 110 controller I/O_CNTL, an operation code decoder OPCDEC, and an address counter ADDR_COUNT, for example. The ID comparator ID_COMP compares whether or not the ID information transmitted from the host device 400 matches the ID information of the storage device to which the control unit 110 belongs. In the case of a match, the control unit 110 outputs an enable signal to the operation code decoder OPCDEC, and the operation code decoder OPCDEC decodes the command (operation code) transmitted from the host device 400. On the other hand, in the case where the ID information transmitted from the host device 400 does not match the ID information of the storage device to which the control unit 110 belongs, the control unit 110 disables the storage device 100 until the next active reset signal is input.

In the case where the command transmitted from the host device 400 is a write command as a result of the operation code decoder OPCDEC decoding the command (operation code) transmitted from the host device 400, the I/O controller I/O_CNTL receives write data from the host device 400. The storage control unit 130 writes the received write data to the storage unit 120 as memory data m_data based on the write command wr from the operation code decoder OPCDEC. The address information addr when performing writing is generated by the address counter ADDR_COUNT based on the clock from the host device 400, and the pieces of write data are sequentially, that is, in order of transmission, written to the storage unit 120. In the case where the write data has been properly written to the storage unit 120, the storage control unit 130 outputs an internal acknowledge signal i_ack to the I/O controller I/O_CNTL.

Figure 2:
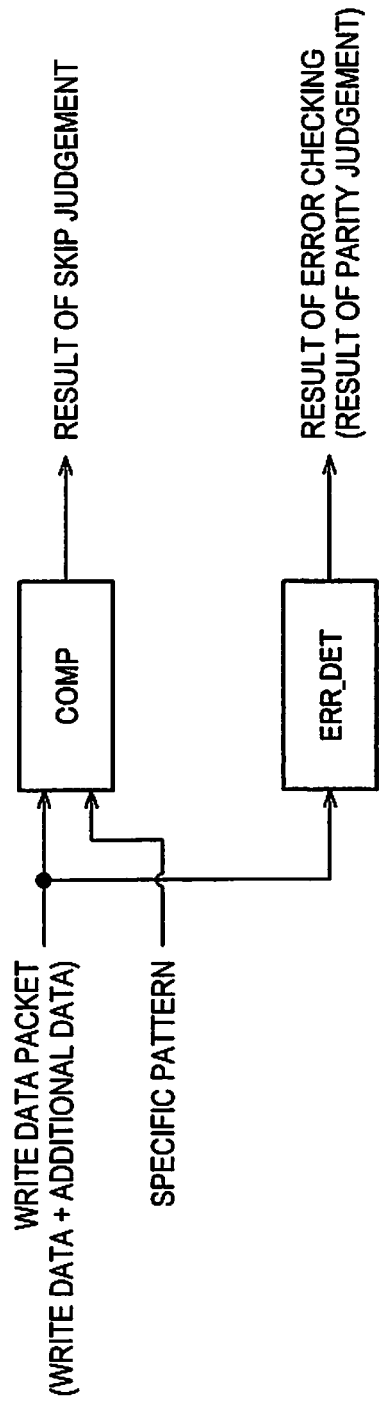
FIG. 2 is an exemplary configuration of a comparator unit and an error detection unit.

Also, the control unit 110 includes a comparator unit COMP that compares data patterns with the specific pattern, and an error detection unit ERR_DET that performs error checking based on the additional data. An exemplary configuration of the comparator unit COMP and the error detection unit ERR_DET is shown in FIG. 2. As shown in FIG. 2, a write data packet (write data and additional data) and the specific pattern are input to the comparator unit COMP, and the comparator unit COMP compares these two inputs. Write data and additional data are input to the error detection unit ERR_DET, and the error detection unit ERR_DET performs error checking of the write data based on the additional data.

In the case where the command transmitted from the host device 400 is a read command, the storage control unit 130 reads out memory data m_data from the storage unit 120 based on the read command rd from the operation code decoder OPCDEC. The address information addr when performing reading is generated by the address counter ADDR_COUNT based on the clock from the host device 400, and pieces of data are sequentially read out.

In the storage device 100 of the present embodiment, the control unit 110 can determine whether or not the data in the write data packet is to be written based on the comparison processing between the data pattern of the received write data packet and the specific pattern. That is, upon receiving a command packet and a write data packet corresponding to the command packet from the host device 400, the control unit 110 makes, in the case where the data pattern does not match the specific pattern, a write instruction wr of the data in the write data packet to the storage control unit 130, along with making an update instruction of the address information addr to the storage control unit 130. On the other hand, in the case where the data pattern matches the specific pattern, the control unit 110 does not make a write instruction wr of the data in the write data packet to the storage control unit 130, but makes an update instruction of the address information addr to the storage control unit 130. In this way, the storage device 100 can determine whether or not writing is permitted based on the data pattern, and proceed to reception processing and write processing of the next write data packet without writing the write data packet for which writing is not permitted. As a result, the time required to perform data write processing on the storage device 100 can be reduced. Note that the details of the data write processing will be described later.

The communication processing unit 410 of the host device 400, in the case of transmitting a command packet and a plurality of write data packets corresponding to the command packet to a j-th (j is an integer that satisfies 1≤j≤n) storage device of first to n-th storage devices, causes write data packets of the plurality of write data packets to include respective pieces of write data and additional data. A write data packet which is not to be written to the storage unit 120 is set such that the data pattern constituted by the write data and the additional data matches the specific pattern ("11111110", for example). Accordingly, the communication processing unit 410 can set the data in the write data packet such that writing is not permitted.

Also, the communication processing unit 410 sets a write data packet, which is to be written to the storage unit 120 of the j-th storage device 100-j, such that the data pattern constituted by the write data and the additional data does not match the specific pattern. Accordingly, the communication processing unit 410 can set the data in the write data packet such that writing is permitted.

Specifically, the specific pattern in the present embodiment is a piece of data that is judged as an error in the error checking. In the case where the specific pattern ("11111110") is set to a piece of information that is to be judged as a parity error, when a normal parity bit is added to a piece of write data, the data pattern does not match the specific pattern.

In this way, the storage device 100 that has received a write data packet, if the write data packet is judged as not to be written based on processing to compare the data pattern and the specific pattern, can proceed to reception processing and write processing of the next write data packet without writing the write data packet. As a result, the time spent on data write processing by the storage device 100 can be reduced.

Also, the communication processing unit 410, after transmitting a write data packet whose data is not to be written to the j-th storage device 100-j, may transmit the next write data packet in the case where the j-th storage device 100-j returns an acknowledge ACK that notifies that there is no communication error. In this way, the host device 400 can proceed to transmission processing of the next data packet upon confirming that a communication error did not occur.

3. Example of Data Configuration

Figure 3:
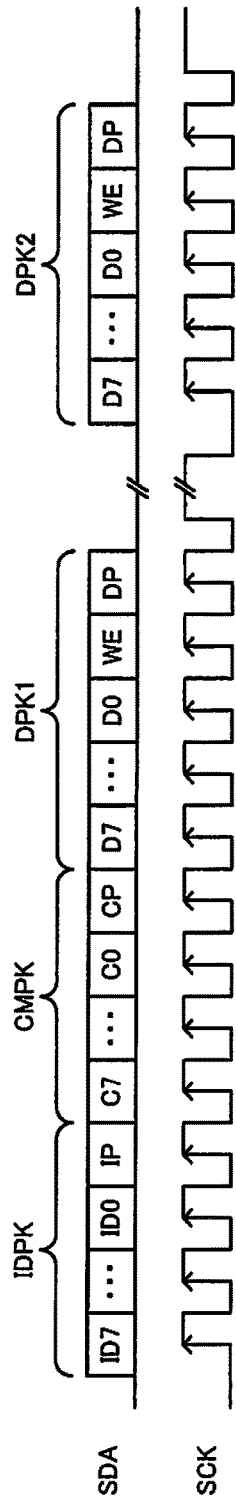
FIG. 3 is an exemplary configuration of a communication packet of a known method.
Figure 4:
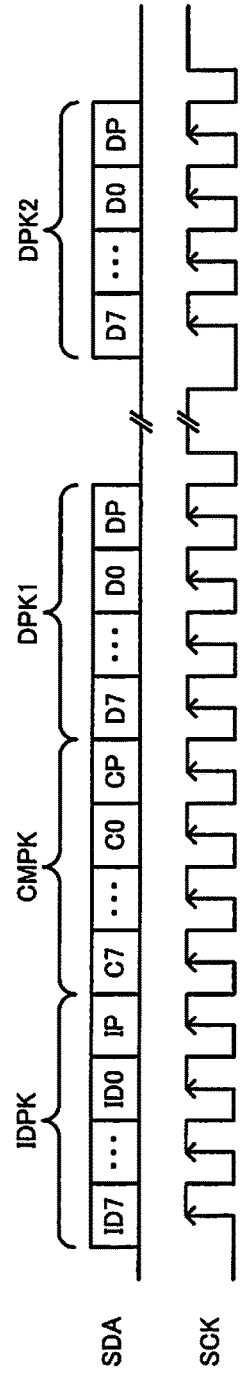
FIG. 4 is an exemplary configuration of a communication packet of a present embodiment.

FIGS. 3 and 4 are diagrams for describing an ID packet, a command packet, and write data packets that are to be transmitted from the host device 400 to the storage device 100. FIG. 3 shows a data packet including the write enable bit WE disclosed in JP-A-2012-88779 as a comparative example, and FIG. 4 shows a write data packet used in the storage device 100 and the host device 400 of the present embodiment.

As shown in FIGS. 3 and 4, the ID packet IDPK is a packet relating to the ID information of the storage device 100, and is constituted by eight bits of ID0 to ID7, for example, and a parity bit IP added thereto. Also, the command packet CMPK is constituted by eight bits of C0 to C7, for example, and a parity bit CP added thereto. Also, each write data packet DPK includes a data portion (write data) constituted by eight bits of D0 to D7 and a parity bit DP. The parity bits IP, CP, and DP are bits that are added for parity checks, and each bit is a bit that is added such that the number of 1s is always even or odd. In this application, a case where the odd parity in which the number of 1s is odd is adopted will be described as an example.

As shown in FIG. 3, in the method disclosed in JP-A-2012-88779, each data packet DPK includes the write enable bit WE in addition to the write data D0 to D7 and the parity bit DP added thereto. On the other hand, in the present embodiment, the write enable bit WE is not needed, since whether or not writing is to be performed is judged based on the data pattern constituted by the write data D0 to D7 and the parity bit DP, as shown in FIG. 4. Note that, although the method of JP-A-2012-88779 can be realized with the data configuration shown in FIG. 4, in this case, effective write data is reduced to seven bits, because one of the bits D0 to D7 is used as the write enable bit WE.

Packets are transmitted from the host device 400 to the storage device 100 in order of the ID packet IDPK, the command packet CMPK, and the data packet DPK, in synchronization with the clock SCK. In the case of transmitting a plurality of data packets, a period is provided in which the storage device 100 returns the acknowledge ACK to the host device 400 after transmission of a first data packet DPK1 by the host device 400, and thereafter the host device 400 transmits a second data packet DPK2 to the storage device 100.

Note that the configuration of each packet in the storage device 100 and the host device 400 of the present embodiment is not limited to the configuration shown in FIG. 4, and various modifications can be implemented such as omitting a portion of the constituent elements, replacing a portion of the constituent elements with another constituent element, or adding another constituent element. For example, the number of bits in each packet may be increased or decreased.

FIGS. 5 to 7 are diagrams for describing a data configuration (memory map) of data to be stored in the storage unit 120. FIG. 5 is a diagram showing logical addresses and a structure of data corresponding to each logical address, FIG. 6 is a diagram showing a correspondence relation between logical addresses and physical addresses, and FIG. 7 is a diagram showing a correspondence relation between logical pages and logical addresses.

As shown in FIG. 5, the storage unit 120 has first to m-th (m is an integer of two or more) logical addresses A1 to Am, and can store 32-bit data for each address, for example. As shown in A1, along with 8-bit data being stored, additional data using another 24 bits are stored in one logical address. Note that the number of bits of data is not limited to eight, and can be increased or decreased.

The additional data mentioned here is an error correction code (ECC), for example. Also, the additional data may include a write lock bit WLCK. The write lock bit WLCK is provided for each address, and is a bit for setting write inhibit (write lock) to the address. For example, in the case where the write lock bit WLCK of address A1 is set to 1, writing to the address A1 is inhibited by the storage control unit 130. Normally, the write lock bit WLCK is set at the time of shipment from the factory, and thereafter the write lock bit WLCK cannot be re-written. Also, the write lock bit WLCK may be constituted by a plurality of bits, instead of one bit. Also, a bit other than the ECC and the write lock bit WLCK may be provided as the additional data. Also, a bit fixed invariably to "1" or "0" may be provided.

The first to m-th data packets DPK1 to DPKm received by the storage device 100 are respectively assigned with logical addresses by the address counter ADDR_COUNT in order of reception (sequentially). The first data packet DPK1 is assigned with a first logical address A1, a second data packet DPK2 is assigned with a second logical address A2, and third to m-th data packets DPK3 to DPKm are respectively assigned with third to m-th logical address A3 to Am in a similar manner. These logical addresses correspond to the address information addr in FIG. 1, and the address information addr is updated (incremented) every time when a data packet is received as a result of the control unit 110 making an update instruction to the address counter ADDR_COUNT.

As described above, in the storage device and the host device of the present embodiment, in the case where the data pattern of the write data packet DPK matches the specific pattern, the update instruction (increment) for the address information addr is made, but the write data is not written.

Specifically, the control unit 110 receives first to m-th data packets DPK1 to DPKm corresponding to the command packet CMPK. An i-th (i is an integer that satisfies 1≤i≤m) write data packet of the first to m-th write data packets DPK1 to DPKm includes an i-th write data and an i-th additional data. In the case where the data pattern constituted by the i-th write data and the i-th additional data is judged as not matching the specific pattern, the control unit 110, along with making an update instruction (increment, for example) of the address information addr, makes a write instruction regarding the i-th write data to the storage control unit 130. In the case where the data pattern constituted by the i-th write data and the i-th additional data is judged as matching the specific pattern, the control unit 110 does not make a write instruction regarding the i-th write data to the storage control unit 130, but makes an update instruction for the address information addr.

In this way, the storage device 100 can proceed to reception processing of the next data packet DPKi+1, without performing write processing of data in DPKi that is set such that writing is not permitted. In the case where DPKi+1 is set such that writing is permitted, the storage device 100 can write the write data D0 to D7 of DPKi+1 to a physical address corresponding to the next logical address Ai+1.

In the example shown in FIG. 6, since one logical address Ai corresponds to one physical address PAi, in the case where DPKi is set such that writing is permitted, the write data D0 to D7 of DPKi are written to the physical address PAi corresponding to the logical address Ai. In FIG. 6, an example in which the storage control unit 130 (an unshown physical address generation unit, in a narrow sense) converts one logical address to one physical address has been described, but the correspondence relation is not limited thereto. The storage control unit 130 may assign one or a plurality of physical addresses to one logical address. In this way, a piece of data that is associated with a given logical address can be written to one physical address, among the plurality of physical addresses, that is selected based on a predetermined rule.

Alternatively, the storage control unit 130 may assign, in units of page, a plurality of logical addresses to one logical page P as shown in FIG. 7. In an example in FIG. 7, four logical addresses are associated with one logical page.

Note that the configuration of the storage unit of the present embodiment is not limited to the configuration shown in FIGS. 5 to 7, and various modifications can be implemented such as omitting a portion of the constituent elements, replacing a portion of the constituent elements with another constituent element, or adding another constituent element. For example, the number of bits of data stored in one address may be increased or decreased.

4. Write Processing

Figure 8:
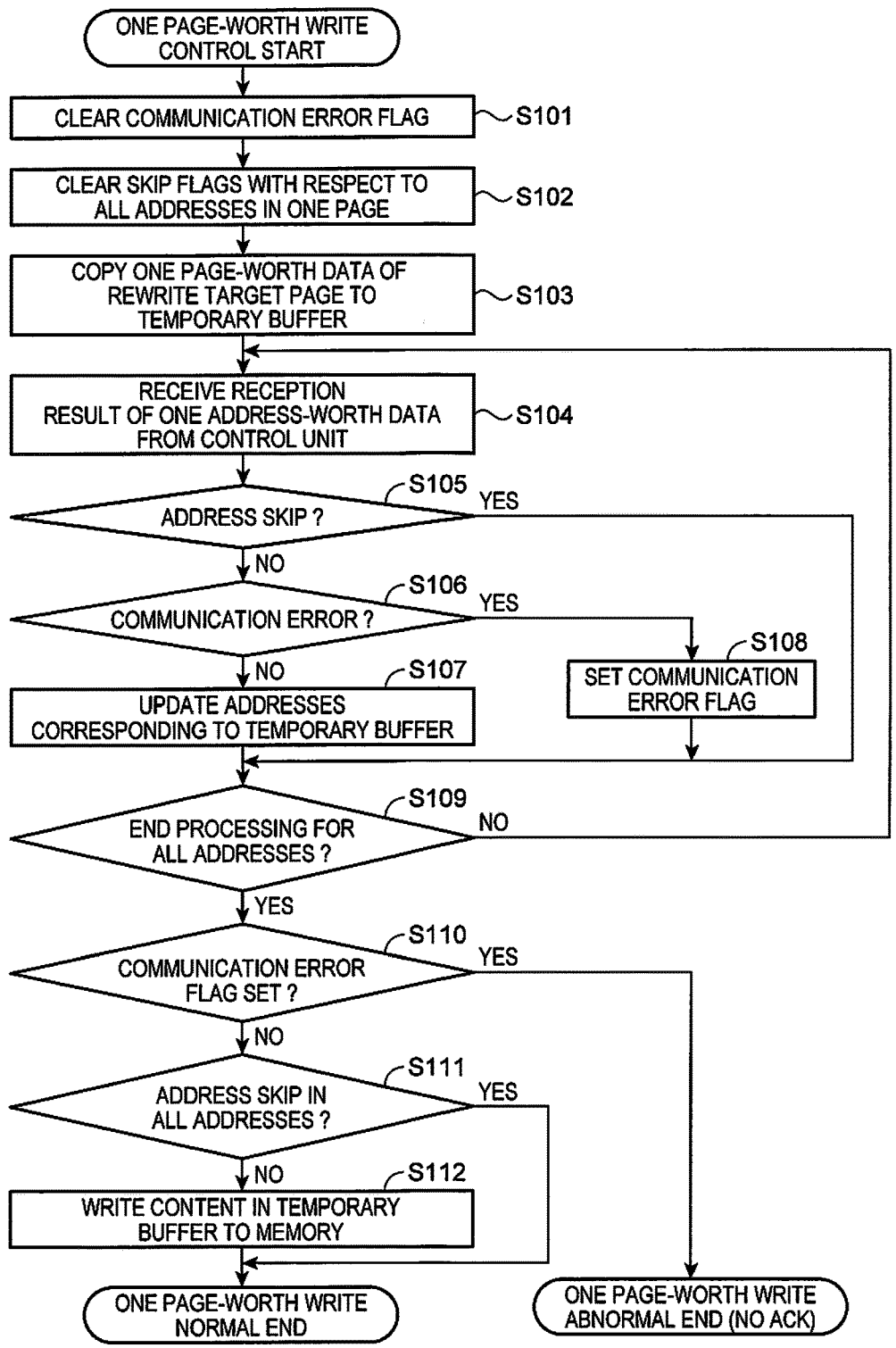
FIG. 8 is a flowchart for describing write processing in a storage control unit.

FIG. 8 is a flowchart for describing write processing in the storage device 100 according to the present embodiment. The processing in each step in FIG. 8 is performed by the storage control unit 130 in the storage device 100. The storage device 100 is a nonvolatile memory in which writing is performed in units of pages, and FIG. 8 is a diagram for describing one page-worth write control. Note that one page here is a 128-bit region corresponding to four addresses, for example.

Once this processing has started, first, the storage control unit 130 initializes a communication error flag and a skip flag (steps S101 and S102). The communication error flag is a flag indicating whether or not a communication error has occurred, and as a result of initialization in step S101, the flag is set to a state indicating that a communication error has not occurred. Also, the skip flag is a flag that is provided so as to be associated with each logical address, and is a flag that indicates whether or not writing of write data that is assigned to the corresponding logical address is to be skipped (set such that writing is not to be performed). As a result of initialization in step S102, a state where writing is not to be skipped for all the addresses in one page-worth addresses is set as the initial state.

The storage control unit 130 copies one page-worth data of the page that is a target, to a temporary buffer (step S103).

Then, the storage control unit 130 acquires a result of receiving one address-worth write data packet from the control unit 110 (step S104). Here, the control unit 110 performs skip judgement and error checking (communication error judgement) on the write data packet DPK received from the host device.

Figure 9:
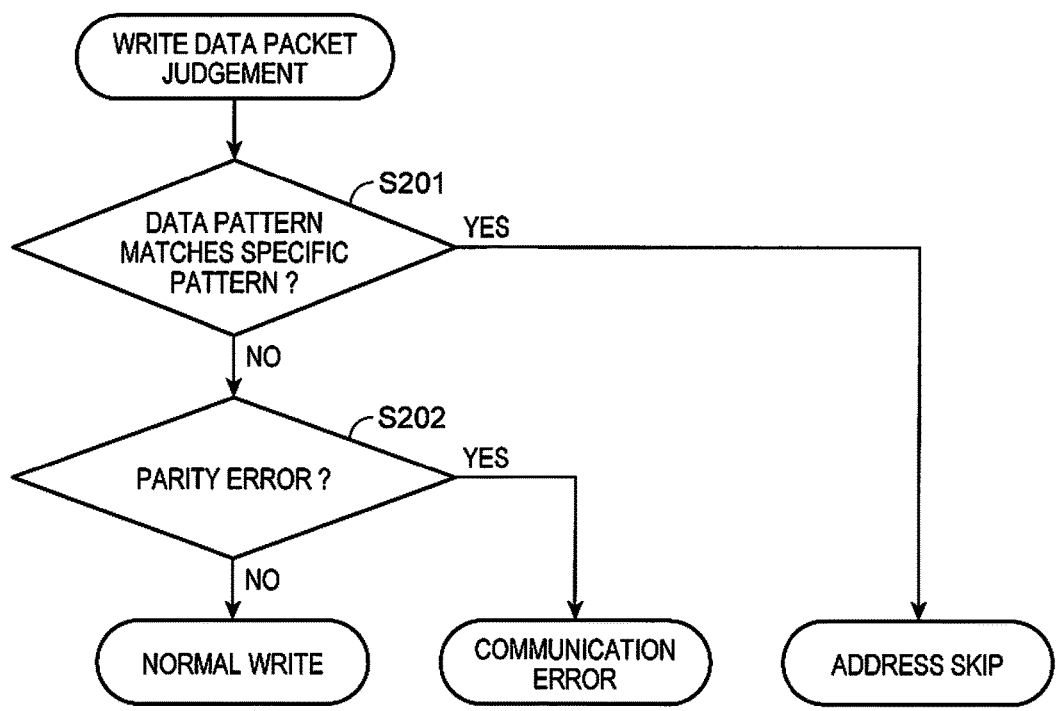
FIG. 9 is a flowchart for describing skip judgement and error check processing in a control unit.

FIG. 9 is a flowchart for describing skip judgement and communication error judgement in the control unit 110. Once this processing has started, the control unit 110 (comparator unit COMP, in a narrow sense) judges whether the data pattern constituted by the write data D0 to D7 and the additional data (parity bit DP) matches the specific pattern (FFh+"0") (step S201). If there is a match, the control unit 110 judges the processing to be "address skip", and ends processing.

If the data pattern does not match the specific pattern (No in step S201), the control unit 110 (error detection unit ERR_DET, in a narrow sense) judges whether or not a parity error occurred (step S202). If a parity error was detected, the control unit 110 judges that a "communication error" has occurred, and ends processing.

If a parity error was not detected (No in step S202), the control unit 110 judges the processing to be "normal write", and ends processing.

The storage control unit 130 receives, along with receiving the write data D0 to D7 (data), the judgement result of the processing shown in FIG. 9 from the control unit 110, in step S104. That is, the storage control unit 130 acquires a judgement result, which is one of "address skip", "communication error", and "normal write".

The storage control unit 130 judges if the acquired judgement result is "address skip" (step S105), and if No, judges if the acquired judgement result is "communication error" (step S106). In the case of not being "communication error" either, that is, the case of "normal write", the storage control unit 130 updates a piece of data of the target address among pieces of data that have been copied to the temporary buffer in step S103 by using a piece of received write data (step S107).

In the case of "communication error", the storage control unit 130 sets the communication error flag to a state indicating that a communication error has occurred (step S108). On the other hand, in the case of "address skip" (Yes in step S105), the processing proceeds to step S109 without performing processing for any of steps S107 and S108. Accordingly, in the case of "address skip", the control unit 110 can receive the next write data packet without updating the temporary buffer. A specific exemplary operation will be described later using a timing chart in FIG. 10.

Then, the storage control unit 130 judges if processing with respect to all the addresses has ended (step S109), and if not, the processing returns to step S104 and processing from step S104 onward continues. When the processing with respect to all the addresses ends, the storage control unit 130 judges the state of the communication error flag (step S110).

If the communication error flag has been set (communication error occurred), the storage control unit 130 judges that writing with respect to one page has ended abnormally. In this case, the control unit 110 notifies the host device of the communication error.

If the communication error flag is not set (No in step S110), the storage control unit 130 refers to the skip flags, and judges whether or not the skip flags have been set in all the addresses in one page-worth of addresses (step S111). If Yes in step S111, that is, in the case where it is judged that writing is not to be performed for each of the addresses, writing itself need not be performed, and therefore writing with respect to one page ends normally without writing being performed. If No in step S111, there is at least a piece of data to be updated, pieces of data of the target page are erased, and pieces of data in the temporary buffer that have been updated in step S107 are written to a corresponding region in a memory cell array portion 120 (S112). After the processing in step S112 as well, the storage control unit 130 ends the one page-worth writing normally.

As shown in FIGS. 8 and 9, that the data pattern matches the specific pattern is sufficient as the condition to judge that write processing is to be skipped. Not only that the data pattern does not match the specific pattern but also that there are no communication errors are the conditions to judge that write processing is to be performed. Specifically, in the case where it is judged that the data pattern constituted by write data and parity data does not match the specific pattern, and the relation between the write data and the parity data is correct, the control unit 110 performs, along with making an update instruction of address information, a write instruction regarding the write data to the storage control unit 130. Also, in the case where it is judged that the data pattern constituted by the write data and the parity data matches the specific pattern, the control unit 110 does not make a write instruction regarding the write data but makes an update instruction of the address information to the storage control unit 130.

In this way, as shown in FIG. 9, both the skip judgement of write processing and communication error judgement can be executed by the control unit 110.

Also, the specific pattern uses a data configuration that is to be judged as an error in error checking, and therefore, the control unit 110, even if it detects an error based on the additional data, cannot discriminate between a communication error having actually occurred and having received a write data packet that is to be a specific pattern through detecting the error alone. Therefore, in the case where it is judged that an error has occurred in error checking based on the write data packet and the additional data and that the data pattern does not match the specific pattern, the control unit 110 transmits information indicating a data error to the host device 400. This corresponds to the processing flow in which, if No in step S201 and Yes in step S202, a judgement result of "communication error" is reached, in FIG. 9.

In this way, "address skip" and a "communication error" can be appropriately distinguished.

Figure 10:
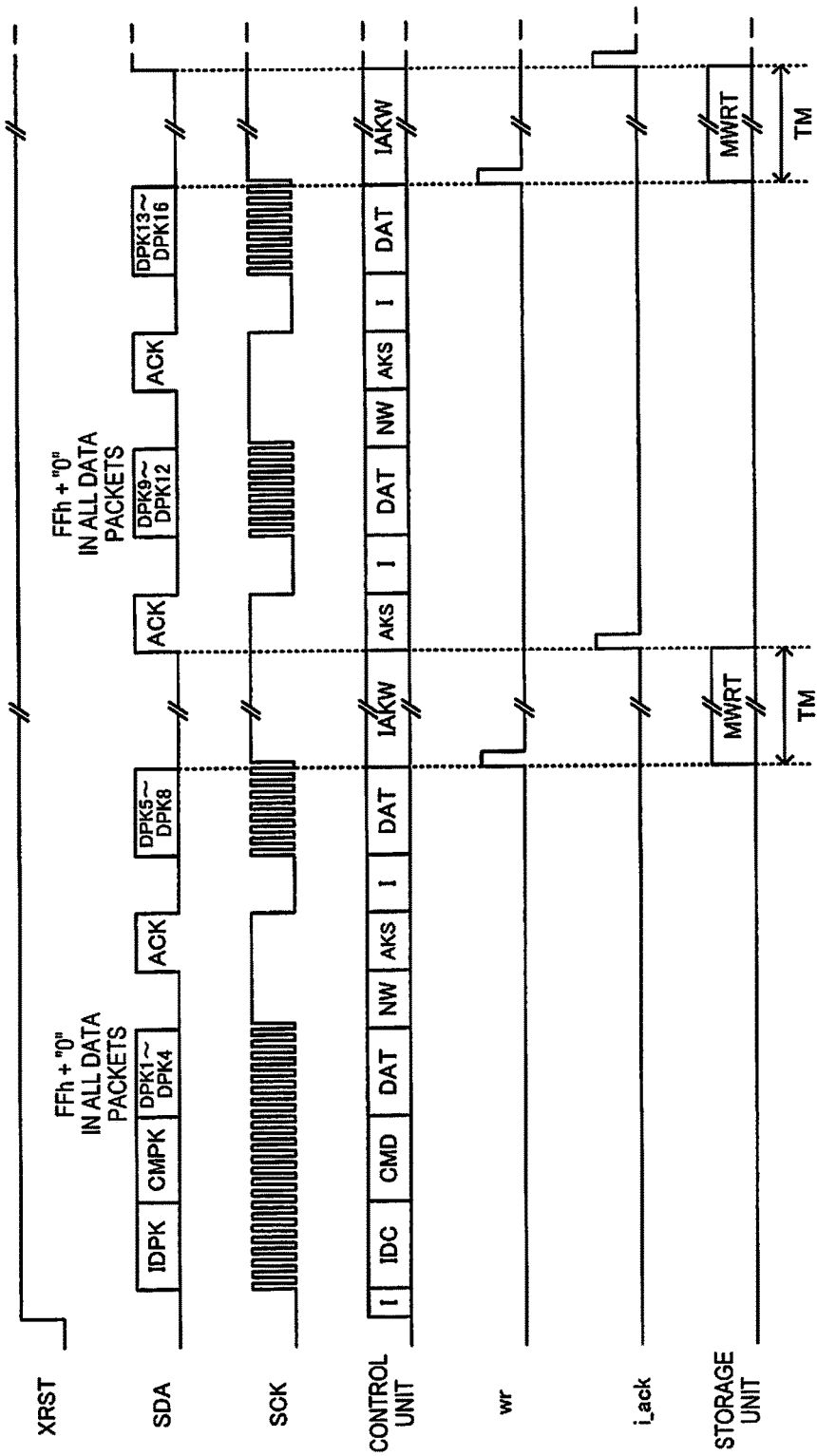
FIG. 10 is a timing chart for describing write processing of the present embodiment.

A timing chart of the write processing in the storage device 100 and the host device 400 of the present embodiment is shown in FIG. 10. Signal waveforms of a reset signal XRST, a clock signal SCK, and a data signal SDA, operating states of the control unit 110 and the storage unit 120 in the storage device 100, and signal waveforms of internal signals wr and i_ack are shown in FIG. 10.

In FIG. 10, I denotes an idle period, IDC denotes an ID recognition period, CMD denotes a command recognition period, DAT denotes a data receiving period, IAKW denotes an internal acknowledge waiting period, MWRT denotes a memory writing period, AKS denotes an acknowledge return period, and NW is a period in which, being a case where a received data packet is set such that writing is not permitted, the presence/absence of a communication error is judged without performing write processing. Note that, as described above using FIG. 7, an example in which one page is associated with four logical addresses will be described. Also, as described above using the flowchart in FIG. 8, an example in which whether or not a write skip is to be performed is judged using one page-worth of data, which is a write unit, will be described.

In the example in FIG. 10, in first to fourth data packets DPK1 to DPK4 and ninth to twelfth data packets DPK9 to DPK12, all pieces of write data are set to FFh ("11111111") and parity bits DP are set to "0". That is, the first to fourth data packets DPK1 to DPK4 and the ninth to twelfth data packets DPK9 to DPK12 are set such that each data pattern matches the specific pattern. Meanwhile, in fifth to eighth data packets DPK5 to DPK8 and thirteenth to sixteenth data packets DPK13 to DPK16, a data pattern of at least one data packet of the four data packets is set so as to not match the specific pattern.

First, the host device 400 sets the reset signal XRST to an H level (high potential level, first logic level in a broad sense) from an L level (low potential level, second logic level in a broad sense), and cancels the resetting of the storage device. Then, the control unit 110 enters an idle state.

Next, the host device 400 transmits an ID packet IDPK, a command packet CMPK, and data packets DPK1 to DPK4 to the storage device 100, and thereafter proceeds to a state of waiting for the storage device 100 to return an acknowledge ACK.

The ID comparator ID_COMP of the storage device 100 recognizes in the ID recognition period IDC that the received ID information matches the ID information of the storage device 100. In the subsequent command recognition period CMD, the operation code decoder OPCDEC recognizes that the received command is a write command. In the next data receiving period DAT, the I/O controller I/O_CNTL receives the write data packets DPK1 to DPK4, and the comparator unit COMP judges whether or not the data pattern in each write data packet matches the specific pattern. Specifically, whether or not the data pattern matches the specific pattern for each of the first to fourth data packets DPK1 to DPK4 is judged.

As shown in FIG. 10, in the case where the data pattern matches the specific pattern for all of the data packets DPK1 to DPK4, the control unit 110 does not make a write instruction to the storage control unit 130. The control unit 110 checks the presence/absence of a communication error, and returns an acknowledge ACK to the host device 400 if it is judged that there are no communication errors. The host device 400, after receiving the acknowledge ACK that notifies that there are no communication errors, transmits data packets (fifth to eighth data packets DPK5 to DPK8) corresponding to the second page.

The control unit 110, in the case where the first to fourth data packets DPK1 to DPK4 (data packets corresponding to an i-th page, in a broad sense) are each set to a state where writing is not permitted, performs reception processing of the data packets DPK5 to DPK8 of the next page (data packets corresponding to an i+1-th page, in a broad sense) without waiting for an internal acknowledge signal Lack from the storage control unit 130.

Since the fifth to eighth data packets DPK5 to DPK8 are set such that the data pattern of at least one data packet thereof does not match the specific pattern, the control unit 110 makes a write instruction wr to the storage control unit 130 after receiving the DPK5 to DPK8. The storage unit 120 writes data in the memory writing period MWRT based on the write instruction wr. In the memory writing period MWRT, the control unit 110 is in the internal acknowledge waiting period IAKW, and waits for the internal acknowledge signal i_ack to be output from the storage control unit 130. In the case where the data has been written normally, the storage control unit 130 outputs the internal acknowledge signal i_ack to the control unit 110. The control unit 110, upon receiving the internal acknowledge signal i_ack, returns an acknowledge ACK to the host device 400. The host device 400, after receiving the acknowledge ACK, transmits data packets (DPK9 to DPK12) corresponding to a third page.

Since all of the data packets DPK9 to DPK12 are set to a state where writing is not permitted in the example in FIG. 10, the control unit 110, after receiving the DPK9 to DPK12, checks the presence/absence of a communication error, and returns an acknowledge ACK to the host device 400 in the case where it is judged that there are no communication errors. The host device 400, after receiving the acknowledge ACK that notifies there are no communication errors, transmits data packets (DPK13 to DPK16) corresponding to a fourth page.

Since at least one data packet of the DPK13 to DPK16 is set to a state where writing is permitted, the control unit 110 makes, after receiving the DPK13 to DPK16, a write instruction wr to the storage control unit 130. The storage unit 120 writes data in the memory writing period MWRT based on the write instruction wr. In the case where the data has been written normally, the storage control unit 130 outputs an internal acknowledge signal i_ack to the control unit 110. The control unit 110, upon receiving the internal acknowledge signal i_ack, returns an acknowledge ACK to the host device 400.

Figure 11:
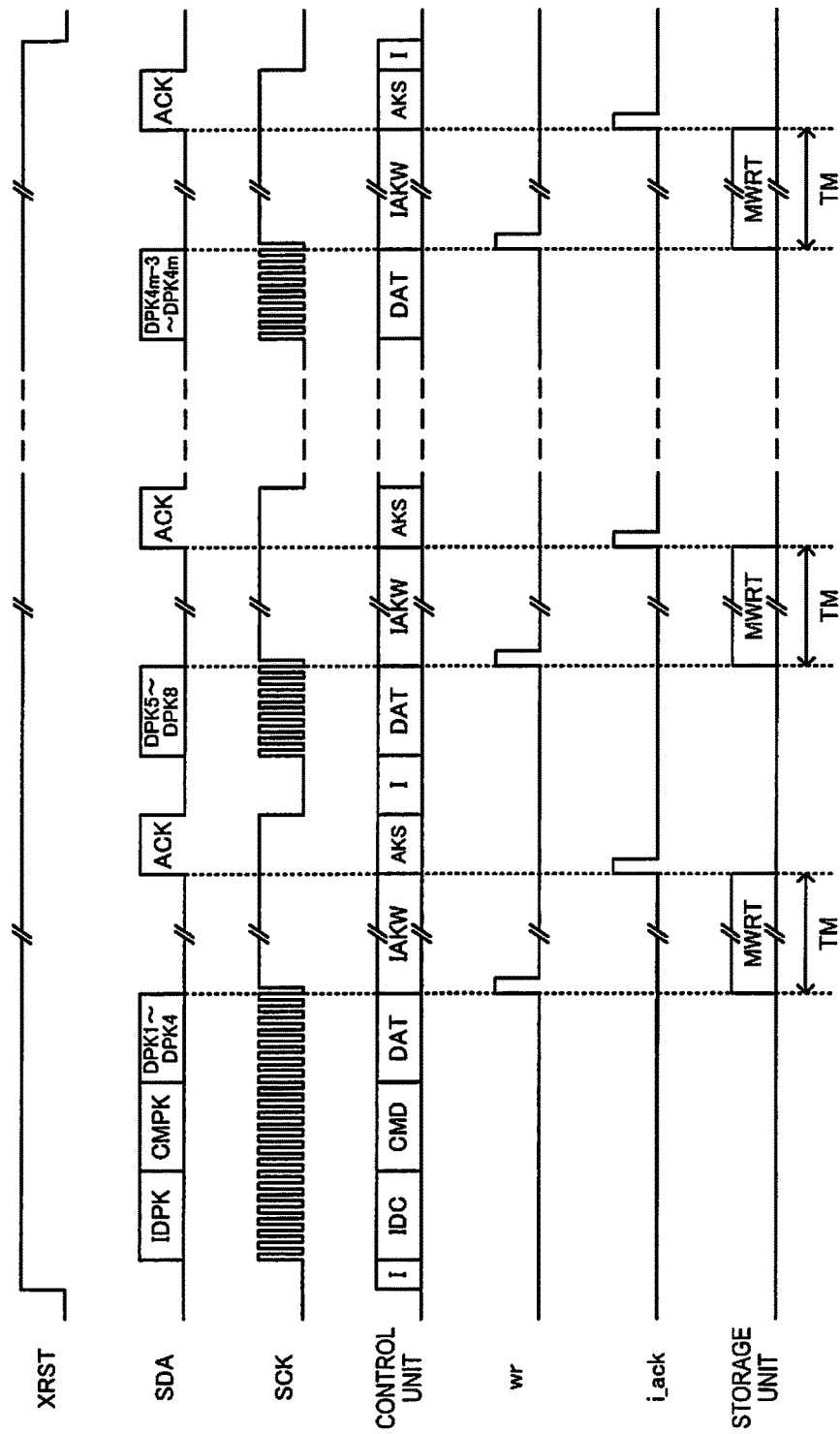
FIG. 11 is a timing chart for describing write processing of a known method.

A timing chart of write processing in the case where a write skip is not performed is shown in FIG. 11, as a comparative example. In the comparative example in FIG. 11, the memory writing period MWRT is needed for each of the groups of data packets (DPK1 to DPK4, DPK5 to DPK8, . . . , DPK4m−3 to DPK4m) corresponding to m pages. For example, the time needed to transmit a data packet is approximately 100 μs, in contrast, the length TM (time needed to write) of the memory writing period MWRT is approximately 5 ms. Accordingly, the write processing time in the case where m page-worth of data packets DPK1 to DPK4m is written is at least m×TM.

On the other hand, according to the storage device 100 and the host device 400 of the present embodiment, a data packet that needs to be written can be selectively written. That is, write processing can be performed such that the data of only a write data packet (specifically, one page-worth of data including the write data packet) that is set such that the data pattern does not match the specific pattern is written, and therefore write processing time can be reduced.

5. System, Liquid Device, and Circuit Board

Figure 12:
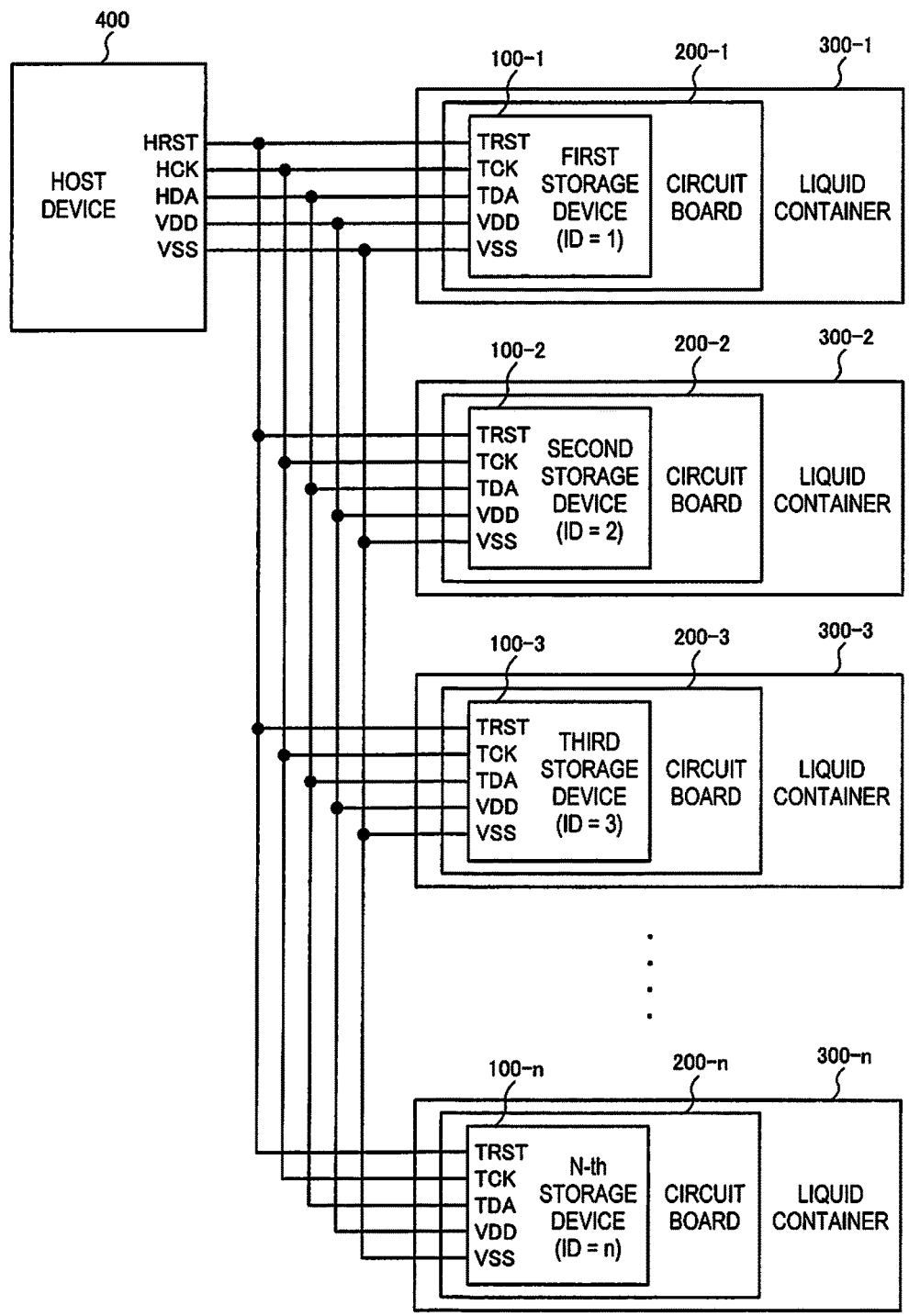
FIG. 12 is an exemplary system configuration.

A basic exemplary system configuration of the present embodiment is shown in FIG. 12. The system of the present embodiment is an inkjet printer or the like, for example, and includes the first storage device 100-1 to n-th (n is an integer of two or more) storage device 100-n, n circuit boards 200-1 to 200-n to which the storage devices are respectively mounted, n liquid containers 300-1 to 300-n that respectively includes the circuit boards, and the host device 400. Note that the system of the present embodiment is not limited to the configuration in FIG. 12, and various modifications can be implemented such as omitting a portion of the constituent elements, replacing a portion of the constituent elements with another constituent element, or adding another constituent element.

Hereinafter, a case where the host device 400 is an inkjet printer body, the liquid containers 300 are each an ink cartridge, and the circuit boards 200 are circuit boards respectively provided in the ink cartridges will be described as an example. Note that, in the present embodiment, the host device, liquid container, and circuit board may be another device, container, and circuit board. For example, the host device may be a reader/writer of a memory card, and the circuit board may be a circuit board provided in the memory card.

The first storage device 100-1 to n-th storage device 100-n each include the reset terminal TRST, the clock terminal TCK, the data terminal TDA, a first power supply terminal VDD, and a second power supply terminal VSS. The n storage devices 100-1 to 100-n respectively include the storage units 120 (such as nonvolatile memories, for example), and the storage units 120 respectively store pieces of ID (Identification) information (ID=1, ID=2, ID=3, etc., for example) for identifying n liquid containers (such as ink cartridges, for example) 300-1 to 300-n. Different IDs are given to respective types such as the color of the liquid that is contained in the liquid container. Also, data such as a remaining ink amount (or consumed ink amount) of the liquid container is written to the storage unit 120 by the host device 400.

The host device 400 is a printer body or the like, for example, and includes the host-side reset terminal HRST, the host-side clock terminal HCK, the host-side data terminal HDA, a first power supply terminal VDD, and a second power supply terminal VSS.

As described above, according to the storage device 100, the host device 400, and the system of the present embodiment, a state where writing is permitted or a state where writing is not permitted with respect to a piece of write data can be set using the data pattern of the write data packet transmitted from the host device 400 to the storage device 100.

Also, the storage device 100 judges whether or not the data is to be written to the storage unit 120 based on processing to compare the data pattern of the received write data packet and the specific pattern, and can proceed to reception processing and write processing of the next data packet without the data being written in the case where writing is not permitted. That is, the storage device 100, with respect to a write data packet that need not to be written, can skip writing of the data, and can proceed to processing for the next write data packet. As a result, the data write processing time with respect to the storage device 100 can be reduced. Also, since write processing of data that need not to be written is not performed, the possibility of destroying data that is already stored at the time of writing due to an error or the like can be reduced.

Figure 13:
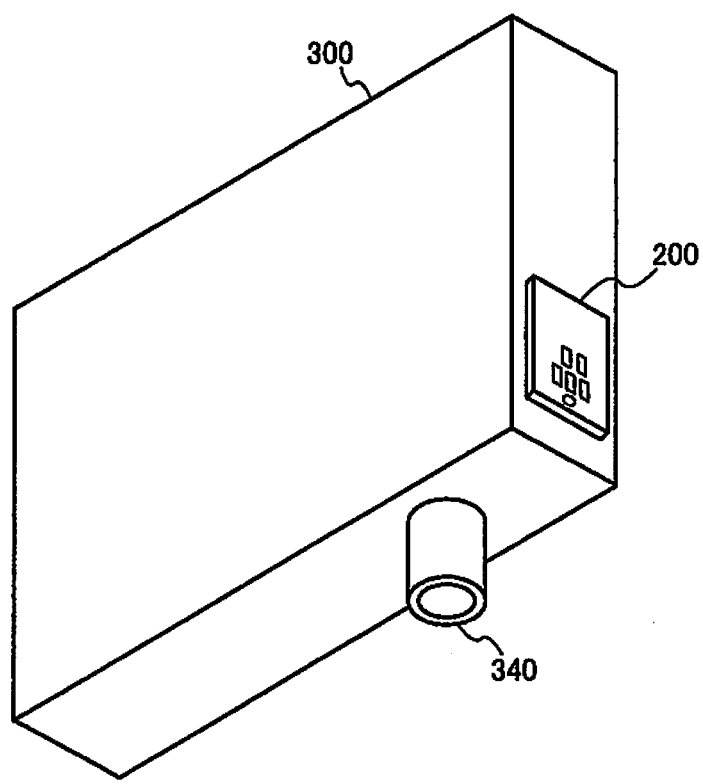
FIG. 13 is a detailed exemplary configuration of a liquid container.

A detailed exemplary configuration of the liquid container (ink cartridge) 300 of the present embodiment is shown in FIG. 13. An unshown ink chamber for containing ink is formed inside the liquid container 300. Also, the liquid container 300 is provided with an ink supply port 340 that communicates with the ink chamber. The ink supply port 340 is for supplying ink to a print head unit when the liquid container 300 is installed to a printer.

The liquid container 300 includes the circuit board 200. The circuit board 200 is provided with the storage device 100 of the present embodiment, and stores data such as a consumed ink amount and transmission/reception of data with the host device 400. The circuit board 200 is realized by a printed board, for example, and is provided on a surface of the liquid container 300. The circuit board 200 is provided with terminals such as the first power supply terminal VDD. When the liquid container 300 is installed to a printer, power supply and exchange of data are performed as a result of these terminals coming into contact (electrically connected) with terminals on the printer side.

Figure 14:
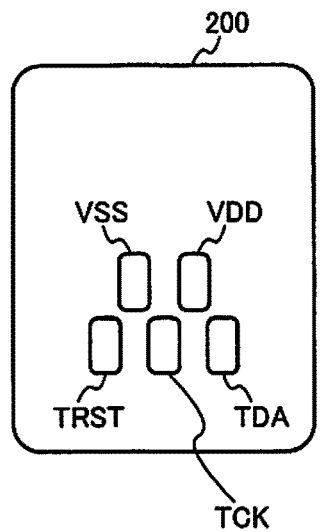
FIG. 14 is a detailed exemplary configuration of a circuit board.
Figure 15:
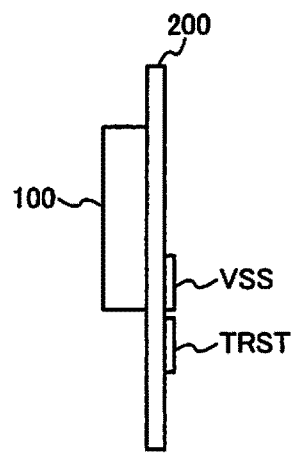
FIG. 15 is a detailed exemplary configuration of the circuit board.

A detailed exemplary configuration of the circuit board 200 provided with the storage device 100 of the present embodiment is shown in FIGS. 14 and 15. As shown in FIG. 14, a terminal group including a plurality of terminals is provided on a surface (surface to be connected to a printer) of the circuit board 200. The terminal group includes the first power supply terminal VDD, the second power supply terminal VSS, the reset terminal TRST, the clock terminal TCK, and the data terminal TDA. Each terminal can be realized by a metal terminal formed in a rectangular (substantially rectangular) shape, for example. Also, each terminal is connected to the storage device 100 via an unshown wiring pattern layer and a through hole provided in the circuit board 200.

As shown in FIG. 15, the storage device 100 of the present embodiment is provided on a back surface (surface on a back side to the surface to be connected to a printer) of the circuit board 200. The storage device 100 can be realized by a semiconductor storage device including a MONOS-type memory, for example. Various types of data relating to ink or the liquid container 300 are stored in the storage device 100. For example, ID information for identifying the liquid container 300 and pieces of data such as a consumed ink amount are stored, for example. The data regarding the consumed ink amount is a piece of data that indicates an accumulated amount of ink that has been consumed in association with the execution of printing with respect to the ink contained in the liquid container 300. The data regarding the consumed ink amount may be information that indicates the amount of ink in the liquid container 300, or information that indicates a proportion of consumed ink amount.

6. Modification

The write data packet is constituted by 8-bit write data and additional data which is a 1-bit parity bit in the above description, but the configuration of the write data packet is not limited thereto. A modification of the communication packet is shown in FIG. 16.

Figure 16:
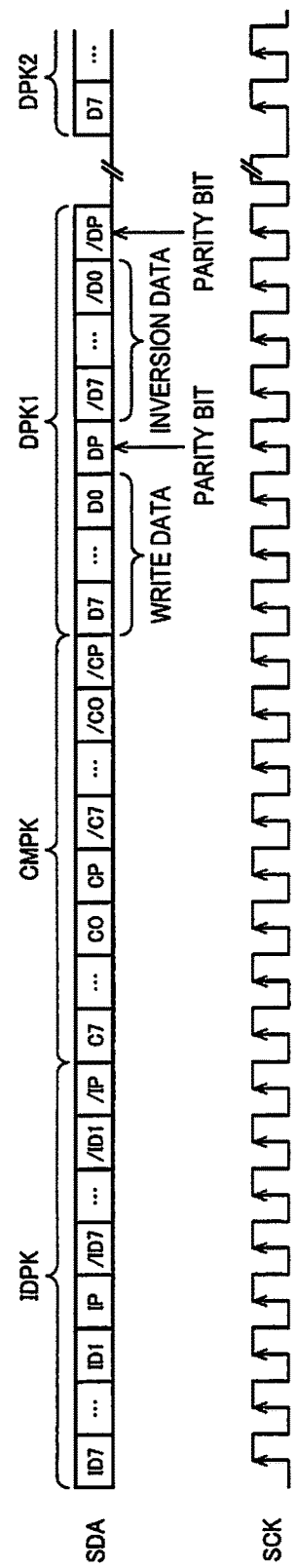
FIG. 16 is another exemplary configuration of the communication packet of the present embodiment.

As shown in FIG. 16, the write data packet may include inversion data of the write data as the additional data. D0 to D7 denote bits of write data, and /D0 to /D7 denote bits of inversion data. The inversion data as referred to herein is data in which 0 and 1 is inverted in each bit, a bit having "1" in the write data has "0" in the inversion data, and a bit having "0" in the write data has "1" in the inversion data. For example, if the write data is FFh ("11111111"), the inversion data is 00h ("00000000").

The inversion data is information used for error checking of the write data. Specifically, the control unit 110 acquires a piece of write data and a piece of inversion data, and judges whether the inversion data is bit-inverted data of the write data. For example, the control unit 110 (error detection unit ERR_DET) judges whether or not an XOR (exclusive OR) of the write data and the inversion data matches FFh ("11111111"). Because the XOR of the write data and the inversion data matches FFh in a normal state, the control unit 110 judges, if there is a match, that there are no communication errors, and judges, if there is no match, there is a communication error.

In this case, because a data pattern constituted by the write data and the additional data (inversion data) includes 16 bits, the specific pattern includes 16 bits as well. Also, it is not preferable that the specific pattern matches data that is intended to be written, and therefore, the specific pattern is set to data that is to be judged as an error in error checking.

Specifically, the specific pattern is set to a pattern that is constituted by a piece of first data and a piece of second data that is not bit-inverted data of the first data. For example, the specific pattern may be FFh+FFh ("1111111111111111").

The host device 400 sets a write data packet that is to be written so as to include a piece of write data and a piece of inversion data of the write data, and set a write data packet that is not to be written to FFh+FFh.

In the storage device 100, the data pattern of the received write data packet is compared with the specific pattern (FFh+FFh). Specifically, if the data pattern constituted by the write data and the inversion data is judged as not matching the specific pattern, the control unit 110 performs, along with making an update instruction of the address information, a write instruction regarding the write data to the storage control unit 130, and if the data pattern constituted by the write data and the inversion data is judged as matching the specific pattern, the control unit 110 does not perform, but makes an update instruction of the address information, a write instruction regarding the write data to the storage control unit 130.

In this case as well, the control unit 110 can judge whether or not writing is to be performed without using the write enable bit WE. Also, the data pattern of a write data packet that is intended to be written does not match the specific pattern unless communication errors occur in a plurality of bits. For example, in the case where the piece of write data is FFh, the piece of inversion data is 00h, and therefore, if the data pattern matches FFh+FFh due to a communication error, it means that errors occur respectively in 8 bits. The probability of communication errors occurring respectively in a plurality of bits is very low, and therefore the possibility of a write data packet that is a target of write processing not being written due to an error can be suppressed in the storage device 100.

Note that, as shown in FIG. 16, the write data packet may include parity data and inversion data of the write data as the additional data. In an example in FIG. 16, the write data packet includes write data D0 to D7, a parity bit DP of the write data, inversion data /D0 to /D7, and a parity bit /DP of the inversion data.

Here, the parity bit DP is a bit that is set such that the number of bits having "1" in 9 bits of the write data D0 to D7 and the parity bit DP is an odd number (in the case of odd parity). Also, the parity bit /DP is a bit that is set such that the number of bits having "1" in 9 bits of the inversion data /D0 to /D7 and the parity bit /DP is an odd number. That is, IDP is not data that is bit-inverted DP.

In this case, the data pattern that is constituted by write data and additional data (inversion data and parity bits) has 18 bits, and thus the specific pattern has 18 bits as well. The specific pattern is a pattern that is constituted by first data, second data that is not inversion data of the first data, and bits for causing the specific pattern to be judged as a parity error in error checking. For example, the specific pattern may be FFh+"0"+FFh+"0" ("111111110111111110").

The data pattern of the received write data packet and the specific pattern (FFh+"0"+FFh+"0") is compared in the storage device 100. Specifically, in the case where the data pattern constituted by write data, parity data, and inversion data is judged as not matching the specific pattern, and the relation between the write data and the parity data is correct, the control unit 110 performs, along with making an update instruction of the address information, a write instruction regarding the write data to the storage control unit 130. Also, in the case where the data pattern constituted by write data, parity data, and inversion data is judged as matching the specific pattern, the control unit 110 does not make a write instruction regarding the write data to the storage control unit 130, but makes an update instruction of the address information.

In this way, since the control unit 110 uses both the inversion data and the parity bits for error checking, a communication error can be accurately detected. Also, the possibility of the data pattern of a write data packet accidentally matching the specific pattern due to a communication error can be suppressed, and therefore, the possibility of misjudging that a write data packet that needs to be written as data that is not to be written can be suppressed.

Figure 17:
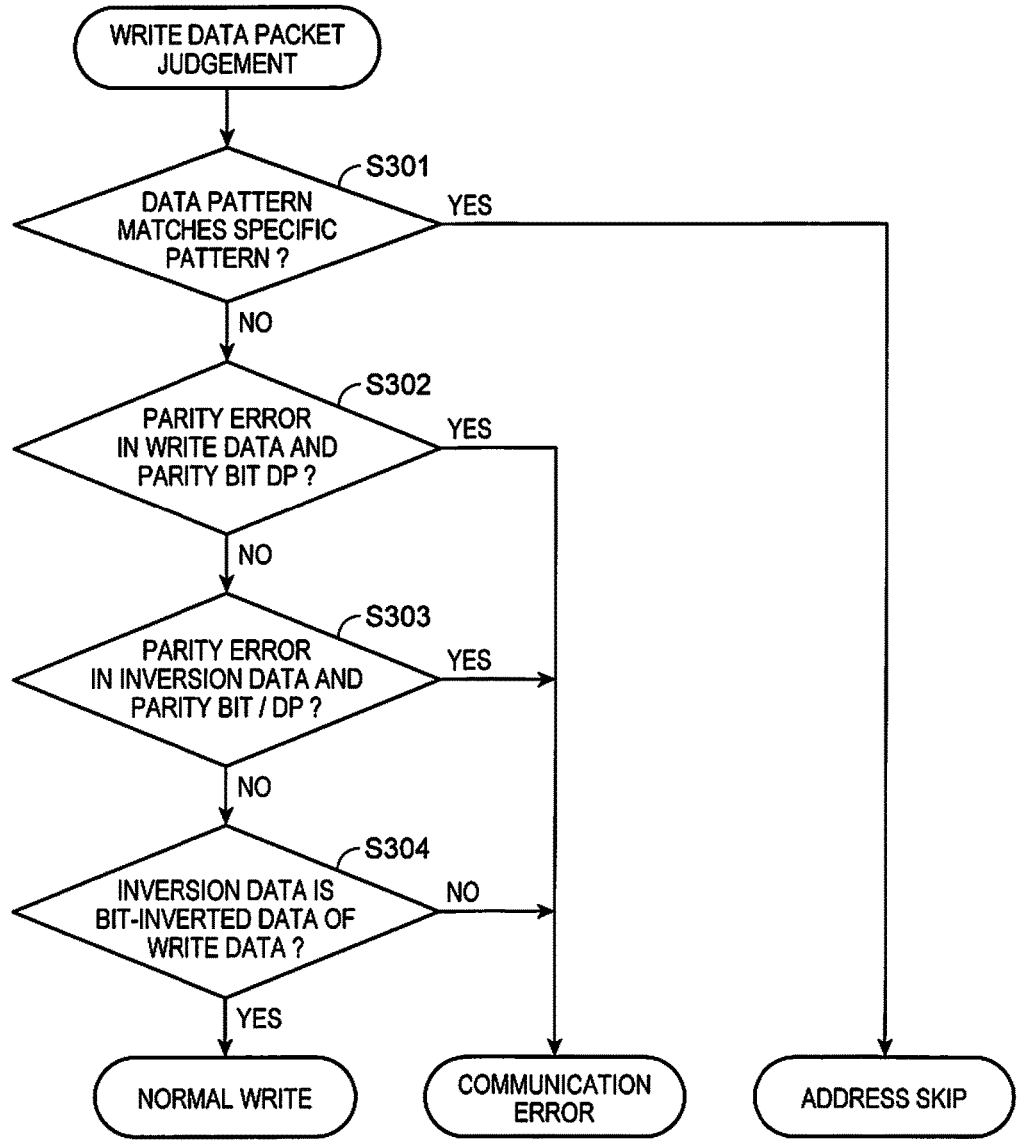
FIG. 17 is another flowchart for describing skip judgement and error check processing in the control unit.

A flowchart for describing the error checking and the skip judgement in the control unit 110 in the case of using the data in FIG. 16 is shown in FIG. 17. Once the processing has started, the control unit 110 (comparator unit COMP) judges whether the data pattern matches the specific pattern (step S301). If there is a match, the control unit 110 reaches a judgement result of "address skip".

If there is no match, the control unit 110 (error detection unit ERR_DET) performs parity check using the write data D0 to D7 and the parity bit DP so as to check whether there is an error (step S302). If an error is detected, the control unit 110 judges as "communication error".

In the case of not a parity error in step S302, the control unit 110 performs a parity check using the inversion data /D0 to /D7 and the parity bit /DP so as to check whether there is an error (step S303). If an error is detected, the control unit 110 reaches a judgement result of "communication error".

In the case of no parity error in step S303, the control unit 110 judges whether the inversion data is bit-inverted data of the write data (step S304). For example, comparison processing between an XOR of the write data and the inversion data and FFh may be performed, as described above. If the inversion data is not bit-inverted data of the write data, the control unit 110 reaches a judgement result of "communication error". If the inversion data is bit-inverted data of the write data (Yes in step S304), the control unit 110 reaches a judgement result of "normal write".

Note that, in this case, it is sufficient that the processing shown in FIG. 9 is replaced by the processing shown in FIG. 17, and the flow of processing performed in the storage control unit 130 is similar to that of FIG. 8.

The value of bits (first data), of the specific pattern, corresponding to the write data was set to FFh in the above description, but the first data is not limited thereto, and an arbitrary value from 00h to FFh can be used as the first data. In such a case, the value of bits (second data), of the specific pattern, corresponding to the additional data may be determined based on the value of bits corresponding to the write data.

In the case where the additional data is a parity bit based on an odd parity, if the first data is 00h, it is sufficient that the second data is a bit that causes it to be judged as a parity error, that is, the second data is "0", and thus the specific pattern is 00h+"0". Similarly, if the first data is 01h ("00000001"), the second data is set to "1", and thus the specific pattern is 01h+"1" ("000000011"). Other than these, regardless of the value of the first data, the specific pattern corresponding to the first data can be set Also, in the case where the additional data is inversion data of the write data, if the first data is 00h, it is sufficient that the second data is set to data that is not bit-inverted data of the first data, that is, the second data is set to 00h, for example, and thus the specific pattern is 00h+00h. Similarly, if the first data is 01h, the second data is set to 01h, and thus the specific pattern is 01h+01h. In this case as well, regardless of the value of the first data, the specific pattern corresponding to the first data can be set. Also, a case where the additional data is constituted by inversion data of the write data and a parity bit is similarly handled.

Also, the specific pattern is not limited to one fixed value, and a plurality of fixed specific patterns can be used. In this case, the control unit 110 may use the plurality of specific patterns at the same time. Specifically, in the case where the data pattern matches one of the plurality of specific patterns, the control unit 110 skips write processing of the write data packet. Note that as a result of increasing the number of specific patterns that are used at the same time, the probability of a write data packet that needs to be written not being written due to an error increases. Therefore, in the control unit 110, a plurality of specific patterns are prepared, and a small number (one, in a narrow sense) of these may be selectively used.

Note that, although not directly related to skipping of the write processing, it is possible that the ID packet IDPK and the command packet CMPK that are included in the communication packet can each be configured so as to include inversion data, as shown in FIG. 16. In this way, a communication error relating to the ID packet IDPK and the command packet CMPK can be accurately detected in the control unit 110 of the storage device 100.

Note that although the present embodiment and modifications have been described above in detail, those skilled in the art will easily understand that various modifications are possible without substantially departing from the new matter and the effect of the invention. Accordingly, all those modifications are to be encompassed in the scope of the invention. For example, a term that is used at least once together with another term having a broader or the same meaning in the specification or the drawings may be replaced with the other term in any part of the specification or the drawings. Configurations and operations of the storage device and the host device are not limited to those described in the present embodiment either, and various modifications can be implemented.

What is claimed is:

1. A storage device comprising:
    a control unit that performs processing for communication with a host device;
    a storage unit to which write data included in a write data packet that is transmitted from the host device is to be written; and
    a storage control unit that performs access control on the storage unit,
    wherein the control unit
        receives the write data packet from the host device,
        in a case where a data pattern constituted by the write data and additional data that are included in the write data packet is judged as not matching a specific pattern, along with making an update instruction of address information, makes a write instruction regarding the write data to the storage control unit, and
        in a case where the data pattern constituted by the write data and the additional data is judged as matching the specific pattern, does not make a write instruction regarding the write data, but makes an update instruction of the address information to the storage control unit,
    the additional data is data for error checking of the write data, and
    the specific pattern is data that is to be judged as an error in the error checking.

2. The storage device according to claim 1,
    wherein the control unit, in a case where the error checking judges that there is an error, based on the write data and the additional data, and the data pattern is judged as not matching the specific pattern, transmits information indicating a data error to the host device.

3. The storage device according to claim 1,
    wherein the write data packet includes parity data as the additional data, and
    the control unit,
        in a case where a data pattern constituted by the write data and the parity data is judged as not matching the specific pattern, and a relation between the write data and the parity data is correct, along with making an update instruction of address information, makes a write instruction regarding the write data to the storage control unit, and
        in a case where the data pattern constituted by the write data and the parity data is judged as matching the specific pattern, does not make a write instruction regarding the write data, but makes an update instruction of the address information to the storage control unit.

4. The storage device according to claim 1,
    wherein the write data packet includes inversion data of the write data as the additional data, and
    the control unit,
        in a case where a data pattern constituted by the write data and the inversion data is judged as not matching the specific pattern, along with making an update instruction of address information, makes a write instruction regarding the write data to the storage control unit, and
        in a case where the data pattern constituted by the write data and the inversion data is judged as matching the specific pattern, does not make a write instruction regarding the write data, but makes an update instruction of the address information to the storage control unit.

5. The storage device according to claim 4,
    wherein the specific pattern is a pattern that is constituted by first data and second data that is not inversion data of the first data.

6. The storage device according to claim 1,
    wherein the write data packet includes parity data and inversion data of the write data as the additional data, and
    the control unit,
        in a case where a data pattern constituted by the write data, the parity data, and the inversion data is judged as not matching the specific pattern, and a relation between the write data and the parity data is correct, along with making an update instruction of address information, makes a write instruction regarding the write data to the storage control unit, and
        in a case where the data pattern constituted by the write data, the parity data, and the inversion data is judged as matching the specific pattern, does not make a write instruction regarding the write data, but makes an update instruction of the address information to the storage control unit.

7. The storage device according to claim 1,
    wherein the write data packet is a write data packet corresponding to a command packet, and
    the control unit
        receives first to m-th (m is an integer of two or more) write data packets as the write data packet corresponding to the command packet, i-th (i is an integer that satisfies 1≤i≤m) write data packet of the first to m-th write data packets including i-th write data and i-th additional data,
        in a case where the data pattern constituted by the i-th write data and the i-th additional data is judged as not matching the specific pattern, along with making an update instruction of the address information, makes a write instruction regarding the i-th write data to the storage control unit, and
        in a case where the data pattern constituted by the i-th write data and the i-th additional data is judged as matching the specific pattern, does not make a write instruction regarding the i-th write data, but makes an update instruction of the address information to the storage control unit.

8. The storage device according to claim 1,
    wherein the control unit includes,
        a comparator unit that compares the data pattern with the specific pattern, and an error detection unit that performs error checking based on the additional data.

9. A liquid container comprising the storage device according to claim 1.

10. A host device comprising:
a communication processing unit that performs processing for communication with first to n-th (n is an integer of two or more) storage devices; and
a control unit that controls the communication processing unit,
wherein the communication processing unit, in a case of transmitting a command packet and a plurality of write data packets corresponding to the command packet to a j-th (j is an integer that satisfies $1 \leq j \leq n$) storage device of the first to n-th storage devices, each write data packet of the plurality of write data packets including write data and additional data,
sets the write data packet whose write data is not to be written to a storage unit of the j-th storage device such that a data pattern constituted by the write data and the additional data matches a specific pattern, and
sets the write data packet whose write data is to be written to the storage unit of the j-th storage device such that the data pattern constituted by the write data and the additional data does not match the specific pattern,
the additional data is data for error checking of the write data, and
the specific pattern is data that is to be judged as an error in the error checking.

* * * * *